US008833706B2

(12) United States Patent
Elsmore et al.

(10) Patent No.: US 8,833,706 B2
(45) Date of Patent: Sep. 16, 2014

(54) CONDUIT CLIP

(75) Inventors: Richard Aubrey Elsmore, Birmingham (GB); Robert Gerald Rudd, Warwickshire (GB)

(73) Assignee: Thomas & Betts, LLC, Wilmington, DE (US)

( * ) Notice: Subject to any disclaimer, the term of this patent is extended or adjusted under 35 U.S.C. 154(b) by 0 days.

(21) Appl. No.: 13/388,458

(22) PCT Filed: Aug. 2, 2010

(86) PCT No.: PCT/GB2010/001463
§ 371 (c)(1),
(2), (4) Date: Feb. 2, 2012

(87) PCT Pub. No.: WO2011/018605
PCT Pub. Date: Feb. 17, 2011

(65) Prior Publication Data
US 2012/0132761 A1 May 31, 2012

(30) Foreign Application Priority Data

Aug. 12, 2009 (GB) .................................. 0914112.8

(51) Int. Cl.
*F16L 3/08* (2006.01)
*F16L 3/10* (2006.01)
*H02G 3/32* (2006.01)
(52) U.S. Cl.
CPC ................ *F16L 3/1075* (2013.01); *H02G 3/32* (2013.01)
USPC .......... 248/74.4; 248/67.5; 248/74.1; 248/62; 174/158 R; 174/163 R; 138/106; 138/108
(58) Field of Classification Search
USPC .............. 248/61, 62, 67.5, 72, 73, 74.1, 74.4; 174/43, 225, 158 R, 163 R; 138/106, 138/108; 24/21, 23 EE, 20 EE, 17 B, 17 AP
See application file for complete search history.

(56) References Cited

U.S. PATENT DOCUMENTS 583,454 A * 6/1897 Burns ............................... 24/22
2,438,362 A * 3/1948 Dunkelberger et al. .. 174/40 CC
(Continued)

FOREIGN PATENT DOCUMENTS

CA        2 474 818        1/2006
DE  20 2007 012 036        1/2009
(Continued)

OTHER PUBLICATIONS

International Search Report and Written Opinion dated Nov. 19, 2010 issued in corresponding EP application No. PCT/GB2010/001463, 3 pages.

(Continued)

*Primary Examiner* — Nkeisha Smith
(74) *Attorney, Agent, or Firm* — Snyder, Clark, Lesch & Chung, LLP

(57) ABSTRACT

A cable mount 10 defines an aperture for receiving an electrical or fluid conduit, and has upstanding ribs 15 which define a circular track 14 for a cable tie. The ribs also define flat mounting planes to prevent rotation of the mount with respect to a substrate. An additional attachment member (41-46) is positioned to allow adaptation of a mold to different kinds of attachment member.

16 Claims, 4 Drawing Sheets

(56) References Cited

U.S. PATENT DOCUMENTS

| | | | | |
|---|---|---|---|---|
| 3,155,355 A | * | 11/1964 | Cappola | 248/74.3 |
| 3,327,357 A | * | 6/1967 | Copony et al. | 24/16 R |
| 4,417,755 A | * | 11/1983 | Gittleman | 285/373 |
| 4,426,754 A | * | 1/1984 | Smith et al. | 24/17 AP |
| 5,354,021 A | * | 10/1994 | Farrell | 248/74.3 |
| 5,390,876 A | * | 2/1995 | Hatano et al. | 248/73 |
| 6,270,387 B1 | * | 8/2001 | Nesheim | 441/133 |
| 6,682,026 B2 | * | 1/2004 | Nagayasu | 248/74.2 |
| 7,143,480 B2 | * | 12/2006 | Igarashi | 24/16 PB |
| 7,284,731 B1 | * | 10/2007 | Johnson et al. | 248/74.4 |
| 7,789,351 B2 | * | 9/2010 | Auer | 248/74.3 |
| 7,963,487 B2 | * | 6/2011 | Saltenberger et al. | 248/74.1 |
| 8,013,248 B2 | * | 9/2011 | Sakata et al. | 174/68.1 |
| 8,028,378 B2 | * | 10/2011 | Shor et al. | 24/19 |
| 8,235,332 B2 | * | 8/2012 | Cesarino | 248/74.5 |
| 2005/0205722 A1 | * | 9/2005 | Krueger | 248/62 |
| 2007/0087639 A1 | * | 4/2007 | Oram et al. | 441/133 |
| 2008/0025800 A1 | * | 1/2008 | Watkins | 405/216 |
| 2008/0245933 A1 | * | 10/2008 | Stokes | 248/74.1 |
| 2008/0251668 A1 | * | 10/2008 | Stokes | 248/230.4 |
| 2009/0272855 A1 | * | 11/2009 | Oram | 248/67.5 |

FOREIGN PATENT DOCUMENTS

| | | |
|---|---|---|
| GB | 2 244 087 | 11/1991 |
| GB | 2 285 667 | 7/1995 |
| JP | 11-166668 | 6/1999 |
| JP | 2002-054765 | 2/2002 |

OTHER PUBLICATIONS

Search Report dated Dec. 1, 2009 issued in corresponding GB application No. 0914112.8, 1 page.

* cited by examiner

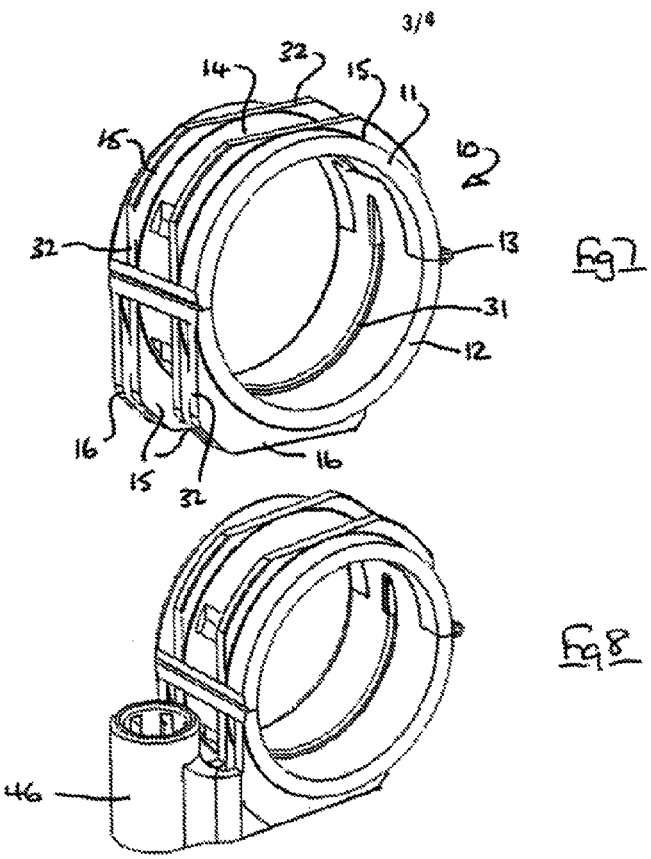
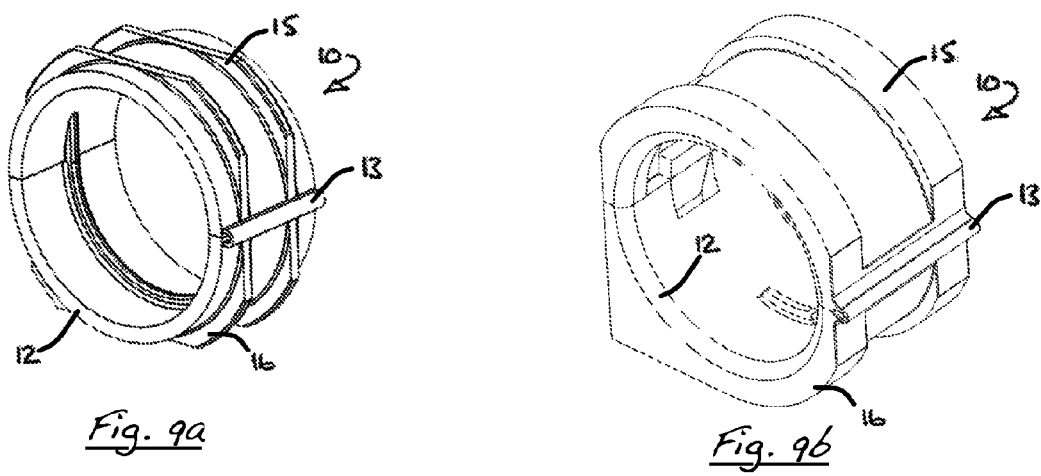
Fig. 9a
Fig. 9b

CONDUIT CLIP

TECHNICAL FIELD

This invention relates to a conduit clip, and particularly to an annular retaining clip for pipes, sheaths, cables and cable bundles.

BACKGROUND TO THE INVENTION

Conduits, typically for fluids or electricity, require clipping to a substructure for retention purposes. Such conduits are often flexible and must be confined to follow a designated path between end attachment locations. For example a cable harness of a vehicle requires to be clipped around an engine bay so as to be connected to components without risk of straining, or damage from hot and/or moving components.

A typical cable clip comprises a moulded plastics component attached at a mounting location, for example a vehicle chassis, and to which a conduit is attached by e.g. snap-fitting. Such an arrangement allows the conduit to be removed and replaced when required, for example to give access to a component behind the conduit, but typically does not ensure that the conduit is replaced in precisely the same location. Clips with removable parts, such as screw-threaded components, are not desirable because of the risk of loss when disassembled. Problems also arise if the conduit has many branches, and the intended fitting path is forgotten between removal and replacement.

These problems may be mitigated by providing replacement clips and/or fixings, but this solution requires service personnel to be provided with the correct replacements, which in practice is not easy to arrange. Furthermore many different kinds of conduit clip are in use, and service personnel may not know what kind is to be encountered.

What is required is an inexpensive universal kind of conduit clip having the ability to be attached securely to a conduit, to be removable from the conduit if required, to be suitable for repeated attachment to a substructure without damage, and to be suitable for adaptation to a variety of fixing methods.

SUMMARY OF THE INVENTION

According to a first aspect of the invention there is provided a conduit attachment comprising a ring member adapted to be placed over a conduit, said ring member having a through axis and a circumferential radially external surface, said surface having axially spaced shoulders thereon to define an arcuate track in the circumference direction, said track being adapted to receive a cable tie.

Such an attachment can be secured to the conduit, and to a substrate by a conventional flexible plastics cable tie; by virtue of the shoulders relative movement with respect to the mounting location and in the direction of the conduit can be prevented.

In a preferred embodiment the radially inner circumferential surface of the attachment is modified to grip a conduit in use to prevent relative axial movement of the conduit therethrough.

The internal circumferential surface of the ring member may include radially inwardly directed projections adapted to positively engage a conduit therein. Such projections may for example comprise one or more circumferential upstands which in use grip a conduit tightly so as to prevent relative movement on the through axis.

A gripping pattern may be provided on the inner circumferential surface, or a relatively soft or adhesive layer. Such surface treatment enhances the resistance to axial movement when clamped around the conduit in use.

In a preferred embodiment the ring member is split so as to allow opening and closing thereof. Typically a plurality of arcuate ring portions are fastened together to define in use a closed ring about the conduit. Preferably semi-circular ring portions are hinged together, the portions being provided with a respective fastening latch so as to be closable about a conduit. It will be appreciated that a cable tie will clamp the ring member to the closed condition, in use. If moulded of plastic, the hinge is preferably an integral living hinge.

The or each latch may be a one-way latch so as to prevent removal thereof. Preferably the latch comprises an arcuate male projection engageable in a corresponding female recess.

In one embodiment the latch comprises a projection contiguous with the inner circumferential surface of the ring member and engageable in a recess provided in said inner circumferential surface so as to be flush therewith. Such an arrangement provides a surface recess latch, which may be useful in some circumstances. Preferably a male upstand of said recess engages an aperture of said projection.

The spaced shoulders may be defined by upstanding ribs of the ring member, or by an annular recess. Preferably the arcuate track defined between said shoulders is substantially smooth.

In a preferred embodiment the shoulders are defined by discontinuous upstanding rib portions, which may each describe an arc of less than 90°. In one embodiment four equi-spaced rib portions are symmetrically provided at each side of said track, each rib portion having straight flanks, and the flanks of adjacent rib portions being co-planar. Each pair of adjacent rib portions preferably defines a flat mounting for co-operation with an adjacent component or substrate. The arrangement allows close fitting of ring members to an adjacent component, and also comprises an anti-rotation feature preventing relative rotation of the ring member with respect to an adjacent component. The adjacent component may for example be a mounting surface or another ring member placed at the side thereof.

In the preferred embodiment the ends of each flank substantially merge with the circumferential track so as to minimize the distance between a conduit and substrate in use.

Where a flat mounting plane is required in only one orientation of the ring member, a single set of facing rib members may be sufficient to define the flat mounting plane. A plurality of mounting planes may be defined as required, but it will be appreciated that as the number of mounting planes increases, the mounting area reduces so reducing stability of the ring member in use for practical purposes the number of mounting planes will not exceed 8. In the preferred embodiment four equi-spaced mounting planes are defined by four facing pairs of rib portions.

Between the flat flank surfaces the ends, each rib portion may describe an arc centred on the through axis and having a substantially constant height. This arc may typically lie in the range 30-45°.

The ribs or rib portions may be multiplied in the direction of the through axis in order to provide additional circumferential or compression strength without increasing material section. For example two ribs may lie at a spacing on each side of a circumferential track. Additional ribs or rib portions may also facilitate alternative component features, as will be described. Multiple rib portions may be provided to define a preferred mounting plane.

The ring member may be adapted to constitute an end for conduit whereby a circumferential internal upstand, which may be circular, engages the end of a conduit to be received therein. Such an upstand will typically be provided at one side only and may further define a radiused mouth for cables or fluid lines protruding from a conduit in the ring member. The upstand may for example provide a termination for a pipe or a cable sheath.

It will be appreciated that the attachment of the invention is intended for use with a conventional cable tie, which is of well-known form and need not be further described here. Cable ties are an universally available item, and if an attachment according to the invention is released by cutting a cable tie, re-attachment is by applying and tightening a replacement cable tie having a width less than the distance between the shoulders.

The attachment is preferably a one-piece plastics moulding, and by virtue of the external shoulders the function and application is intuitive. Most importantly, the attachment can be adapted to retain its datum position on the conduit if released from the corresponding attachment location. The internal bore thereof can be selected to suit the conduit in question, so as to give a close clamping fit if desired.

The cable tie may be used to fix the attachment to a suitably apertured mount, or a commonly available cable tie variant may include a suitable mount, such as an integrally moulded fir tree fixing.

The ring member may further include an attachment member, for example an integrally formed fir-tree, arrow head, p-clip or stud mounting. Such an arrangement increases the mounting possibilities for the ring member whilst retaining the option of mounting by cable tie.

In a preferred embodiment, the conduit attachment comprises a plastic moulding having two substantially semi-circular members joined by a living hinge. An additional attachment member may be integrally moulded to the conduit attachment, and is preferably substantially opposite the living hinge so as to facilitate substitution by changing a mould tool insert. In the preferred embodiment the additional attachment member is moulded to one end of a first semi-circular portion of the ring member, the other end of the first semi-circular portion being attached by an integral hinge to the second semi-circular ring portion. The attachment direction of the additional attachment member is preferably on a diameter of the ring member, or in the plane orthogonal thereto. Preferably the additional attachment member defines a through hole in the circumferential direction of the conduit attachment and adapted to receive a cable tie. In this way a cable tie may bind closely around the conduit attachment for the majority of the circumference thereof, typically in contact with 300-340° of the circumference thereof.

It will be understood that on the one hand the conduit clip of the invention provides a secure fastening to a conduit which is adapted to prevent relative axial movement, and on the other hand the conduit clip allows retention by cable tie so as to prevent relative movement with respect to a mounting substrate.

According to a second aspect of the invention there is provided a mould tool for a conduit clip consisting of two semi-circular parts connected by a living hinge, and an additional clip attachment member.

The mould tool defining a first mould cavity in which said semi-circular parts are moulded side by side so as to be concave in a common first direction, and wherein said first direction comprises a major opening direction of the mould, and said mould tool defines a separable second mould cavity at one end of a semi-circular mould cavity for the additional attachment member, said second mould cavity having a minor opening direction which is said first direction, or orthogonal thereto.

Thus the major opening direction comprises a separation axis generally radial of the semi-circular mould cavities, which are side by side. The minor opening direction can be in the same direction or in directions orthogonal thereto so as to permit variation in the kind of additional attachment member which is to be moulded integrally with the conduit clip. The second mould cavity is at one end of the mould cavity for the semi-circular parts, generally opposite a hinge region between these parts.

It will be understood for example that different kinds of additional attachment member may require different mould opening directions, but that the invention permits a mould for the conduit clip to have various mould inserts (or none) by which the conduit clip can be formed with the desired attachment. This means that a complete mould for each variation of conduit clip is not required, but that one mould can be adapted by substitution of a moulding tool insert which is positioned so as not to constrain the opening or release direction of the moulded attachment member. The same kind of attachment member may for example be moulded to face in a different direction, and this requires a different principal opening plane for the mould of the attachment member.

In the preferred embodiment a first mould part defines the first mould cavity and has a principal opening plane, and the mould attachment defines the second mould cavity. The mould attachment is adapted to couple with the first mould part from the side, generally orthogonal to the principal opening plane.

The invention also provides a method of moulding a conduit clip having one of several additional attachment members, the method comprising the steps of:

making a first split mould having a first cavity for a circular clip comprising semi-circular parts joined by a living hinge, attaching one of several second split moulds to the side of the first split mould generally orthogonal to the principal opening plane of the first split mould, the selected second split mould defining a second cavity for an additional clip attachment member, and the first and second cavities being in communication, moulding a conduit clip in the first and second cavities, and separately opening the first and second split moulds to release the moulded conduit clip.

In one embodiment the second split mould has a principal opening direction orthogonal to the principal opening direction of the first split mould.

BRIEF DESCRIPTION OF DRAWINGS

Other features of the invention will be apparent from the following description of several preferred embodiments illustrated by way of example only in the accompanying drawings in which:—

FIG. 7 shows the clip of FIG. 6 in the closed condition;

FIG. 8 shows a sixth embodiment of the invention having a stud mount.

FIGS. 9A and 9B illustrate rear perspective views of a closed conduit clip according to two embodiments of the invention;

With reference to the drawings, FIGS. 7, 9a, and 9b illustrate a one-piece moulded cable clip 10 comprising two semi-circular members 11, 12 joined by a living hinge 13.

Externally the clip defines a circumferential track 14 bounded by upstanding shoulder portions 15 which are discontinuous and arranged in two circular arrays. The lower member 12 (as illustrated) has additional symmetrical shoulder portions 16 axially outside those portions defining the track 14.

Figure 6:
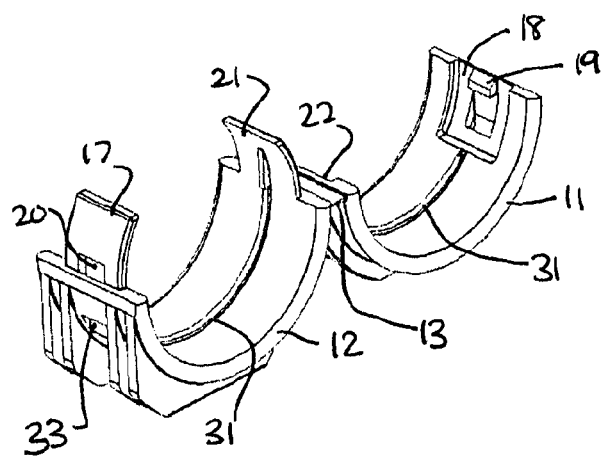
FIG. 6 shows a conduit clip according to the invention, but without an additional moulded attachment.

As seen in FIG. 6, a male flap 17 of one member 12 is engageable in a female recess 18 of the other member 11, and is retained by a peg 19 of the recess engaging in an aperture 20 of the flap. The flap 17 and recess 18 comprise a releasable latch. A second male flap 21 and recess 22 provide location for the semi-circular members at the hinge side. Other kinds of latch are possible; however it will be noted that the illustrated embodiment provides a smooth flush planar surface to the inside of the clip 10 when closed.

In use the clip 10 is closed about a conduit, and secured to a substrate by a cable tie located around the track 14 between the shoulders 15. The cable tie also serves to maintain the clip in the closed condition by virtue of the encircling form. Sideways slippage is obviated by the shoulder portions 15. The cable tie may itself include an integral attachment device, such as the fir free fastener, or may be plain and engage through a hole or around a form of an attachment substrate.

Within the clip an upstanding projection 31, which is typically circular and substantially continuous, engages or locks into the conduit to prevent relative axial movement. The conduit may define a suitable channel to engage the projection 31, and may for example comprise a spiral or grooved armoured sheath. Other forms of physical upstand are of course possible, and may be moulded to precisely engage a conduit shape. The projection 31 may be discontinuous. A non-slip surface may be provided as an alternative.

The shoulder portions 15 are flat topped in mutually perpendicular directions, as illustrated. Thus the flank ends 32 of each projection are straight and co-planar with the immediate neighbours both in the circular and axial directions. This arrangement allows close-fitting against a substrate or another conduit clip, and is also an anti-rotation feature.

The ends of adjacent ones of the shoulder portions 15 preferably merge, as illustrated to define a continuous flat edge which, at the centre, substantially merges with the circumferential track 14. This arrangement minimizes the thickness of the clip against a mounting substrate or an adjacent component.

An aperture 33 allows the flap 17 to be released by push through of a tool, such as a screwdriver blade.

The additional shoulder portions 16 allow for better resistance of clamping loads without an increase of material section, and furthermore facilitate the addition of alternative mounting features, as will be described.

Figure 1:
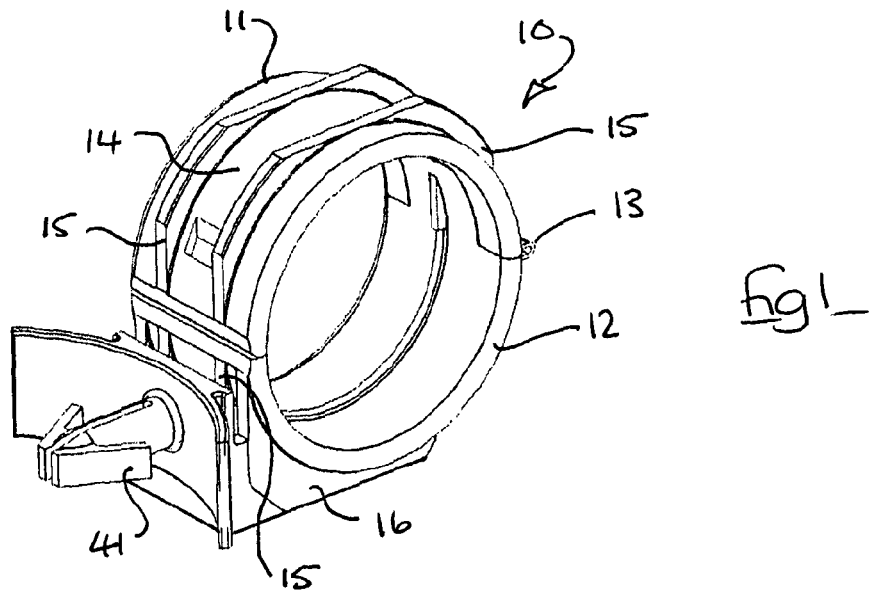
FIG. 1 illustrates a closed conduit clip according to a first embodiment of the invention, and having an arrowhead mount.
Figure 2:
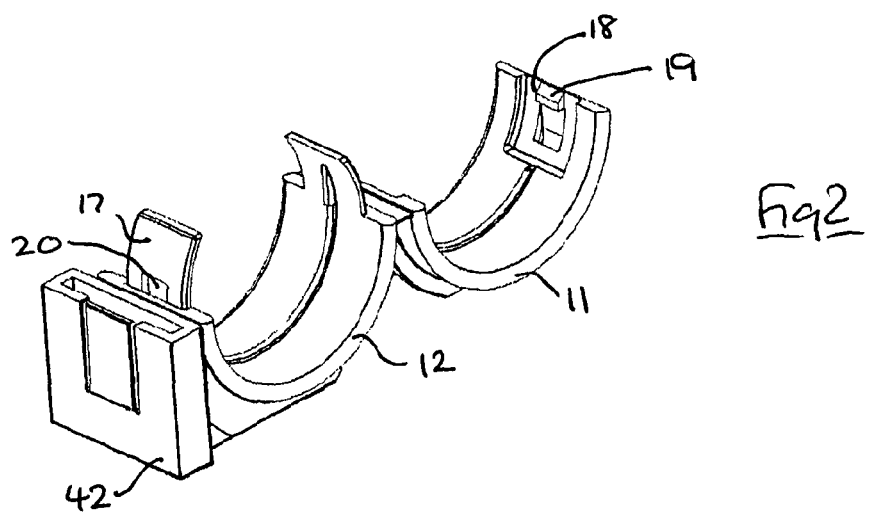
FIG. 2 illustrates an alternative clip with an edge bracket mount, in the open condition.
Figure 3:
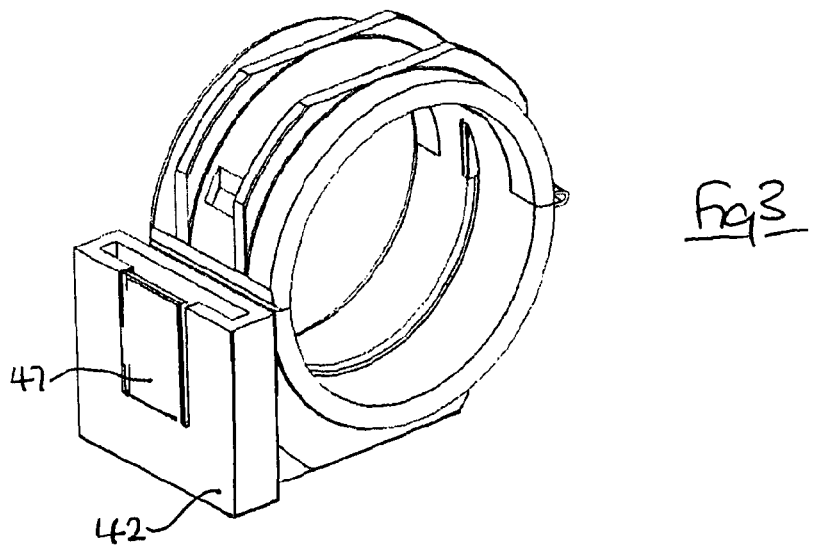
FIG. 3 illustrates the clip of FIG. 2 in the closed condition.
Figure 4:
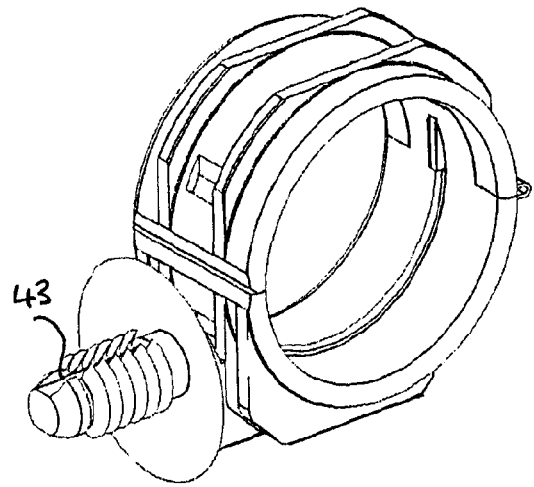
FIG. 4 shows a third embodiment of the invention having an integrally moulded fir tree fastener.

FIG. 1 illustrates an integrally moulded arrow-head fastener 41, and FIGS. 2 and 3 show a bracket fastener 42. Likewise FIGS. 4 and 5 respectively show a fir tree fastener 43 and a p clip mount 44 having a hole 45 for a screw or the like. FIG. 8 shows a stud mount 46.

The embodiments having an additional fastener can conveniently be moulded by changing inserts of a mould tool having the basic clip configuration of FIG. 7. Thus the integral fastener is moulded in line with the open clip and projects oppositely to the living hinge 13, so that one of the members 12 has the other member 11 at one side, and the fastening portion at the other side.

An aperture may be moulded between the member 12 and the additional fastening portion so as to receive a cable tie if required for additional security. By providing the shoulder portions 15 on all embodiments it will be appreciated that a cable clip may be used for attachment in the event of failure or breakage of an integrally moulded fastening.

Figure 10:
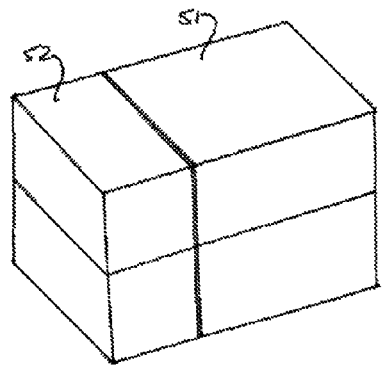
FIGS. 10-13 show schematically various arrangements of mould parts or mould inserts which are facilitated by the present invention.

The linear mould arrangement, which places the additional fastener at one end also facilitates moulding of a double cable clip whereby two conduits can be secured side by side. Thus FIG. 10 illustrates schematically a two-part mould 51 for a cable clip, which may be used in configuration with a two-part mould 52 for an additional attachment. Such an arrangement could be used to mould a clip according to for example FIG. 8.

Figure 11:
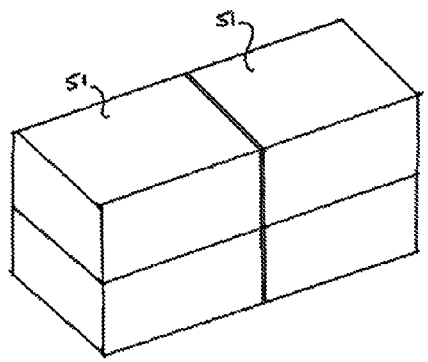

FIG. 11 shows side by side two-part moulds 51 for moulding a double clip having respective hinge portions at opposite ends so that the closing portions meet at the middle. The diameters of the clip portions need not be the same.

Figure 5:
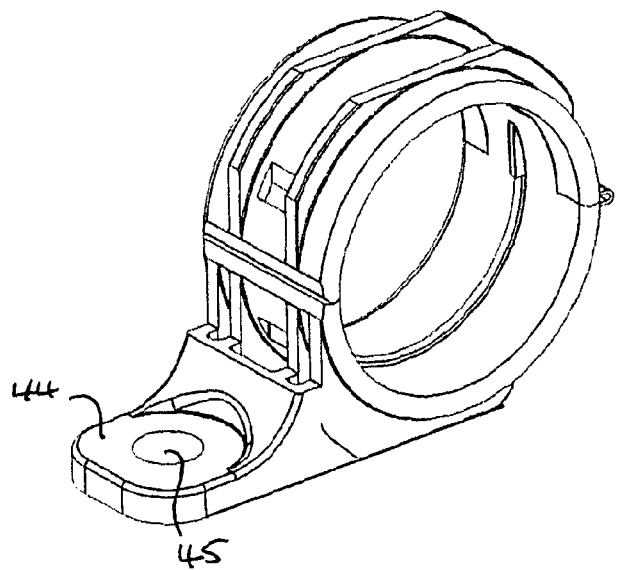
FIG. 5 shows a fourth embodiment of the invention having a p-clip bracket mount.
Figure 12:
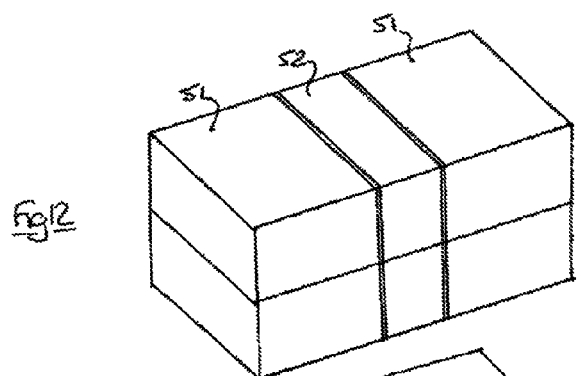

FIG. 12 shows the side by side moulds 51 of FIG. 10 having an intermediate mould 52 for an additional attachment member such as the p clip mount of FIG. 5. The hinge portions are again located at opposite ends. The principal opening direction of the mid-portion 52 is in this embodiment the same as that of the end portions 51 so as to suit the attachment member selected.

Figure 13:
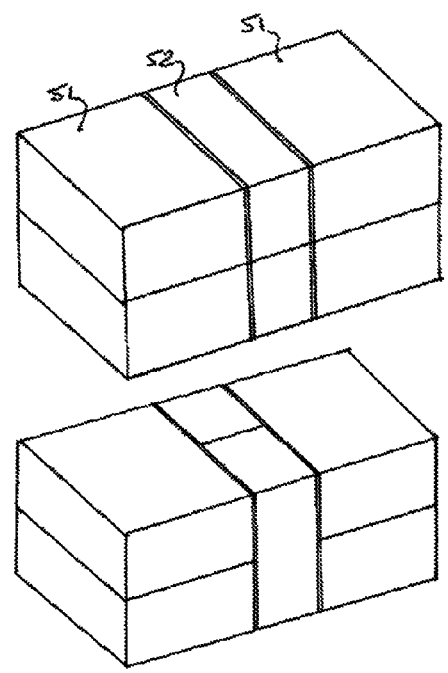

FIG. 13 shows side by side moulds 51 having an intermediate mould 52 with a different release direction, thus corresponding to a different direction for an attachment member. Several different release directions are also of course possible in the arrangement of FIG. 10.

The invention claimed is:

1. A conduit attachment comprising a ring member adapted to be placed over a conduit, said ring member having a through axis and a circumferential radially external surface, said surface having axially spaced shoulders thereon to define an arcuate track in a circumference direction, said track being adapted to receive a cable tie,
    wherein each shoulder comprises a plurality of equispaced shoulder portions,
    wherein each end of each shoulder portion is flattened tangentially with respect to an external surface of the ring member and wherein at least two circumferentially adjacent ends of adjacent shoulder portions are co-planar,
    wherein the flattened ends of the shoulder portions include regions that are substantially flush with an outer surface of the arcuate track, thereby minimizing maximum dimensions of the conduit attachment.

2. An attachment according to claim 1, wherein said track is substantially circular.

3. An attachment according to claim 1, wherein said shoulders are discontinuous.

4. An attachment according to claim 1, wherein said ring member is split to allow opening and closing thereof.

5. An attachment according to claim 4, wherein said ring member comprises semi-circular ring portions.

6. An attachment according to claim 5, wherein said ring portions are connected.

7. An attachment according to claim 6, wherein said ring portions are connected by a living hinge.

8. An attachment according to claim 1, and further including a restraining portion for engagement with a mounting substrate.

9. An attachment according to claim 8, wherein said restraining portion comprises an aperture.

10. An attachment according to claim 8, wherein said restraining portion comprises a snap-fitting projection for engaging the mounting substrate.

11. An attachment according to claim 9, wherein said track extends between said restraining portion and said ring member.

12. An attachment according to claim 1, wherein each shoulder comprises four equispaced shoulder portions defining four equispaced flat planes, wherein each of the four equispaced flat planes are tangential with respect to the external surface of the ring member.

13. An attachment according to claim 10, wherein said track extends between said restraining portion and said ring member.

14. An attachment according to claim 1, wherein said axially spaced shoulders comprise a first shoulder having a first plurality of equispaced shoulder portions and a second shoulder having a second plurality of equispaced shoulder portions, wherein the flattened ends of the first plurality of equispaced shoulder portions are co-planar in an axial direction with corresponding flattened ends of the second plurality of equispaced shoulder portions.

15. A conduit attachment comprising:

a ring member adapted to be placed over a conduit, said ring member having a through axis and a circumferential radially external surface, said surface having axially spaced shoulders thereon to define an arcuate track in a circumference direction, said track being adapted to receive a cable tie, wherein each shoulder comprises a plurality of shoulder portions, wherein at least one end of each shoulder portion is flattened tangentially with respect to an external surface of the ring member and wherein at least two of the circumferentially adjacent ends of adjacent shoulder portions are co-planar, wherein the flattened ends of the shoulder portions include regions that are substantially flush with an outer surface of the arcuate track, thereby minimizing maximum dimensions of the conduit attachment, wherein said ring member is split to allow opening and closing thereof, and wherein said ring member includes a latch engageable in a closed condition thereof.

16. An attachment according to claim 15, wherein said latch is releasable.

* * * * *